United States Patent [19]

Sasaki et al.

[11] Patent Number: 5,504,644
[45] Date of Patent: Apr. 2, 1996

[54] RECORDING/ERASING PREVENTION DEVICE

[75] Inventors: Kazuo Sasaki; Osamu Koizumi, both of Miyagi, Japan

[73] Assignee: Sony Corporation, Tokyo, Japan

[21] Appl. No.: 321,330

[22] Filed: Oct. 11, 1994

[30] Foreign Application Priority Data

Oct. 14, 1993 [JP] Japan .................................. 5-257359

[51] Int. Cl.⁶ ................................................ G11B 15/04
[52] U.S. Cl. ........................................ 360/132; 360/60
[58] Field of Search ...................... 360/132, 60

[56] References Cited

U.S. PATENT DOCUMENTS

| | | | |
|---|---|---|---|
| 4,908,725 | 3/1990 | Iwahashi | 360/132 |
| 5,184,255 | 2/1993 | Lowry et al. | 360/60 |
| 5,218,502 | 6/1993 | Tanaka et al. | 360/132 |
| 5,239,437 | 8/1993 | Hoge et al. | 360/132 |

*Primary Examiner*—John H. Wolff
*Attorney, Agent, or Firm*—Ronald P. Kananen

[57] ABSTRACT

A tape cartridge includes a casing having an upper portion and a lower portion. A channel formed in the upper of portion of the casing is disposed at a corner portion defined by an external upper surface and an external lateral surface of the casing. The channel has a first rectangular-shaped portion formed in the upper surface and a second, adjacent rectangular-shaped channel formed in a lateral surface of the cartridge. A read-only detection opening is formed within the channel. A slidable write-protect member having a main portion and a side portion formed perpendicular to the main portion is disposed within the recess and moves between a first position in which the side portion covers the read-only detection opening and a second position in which the read-only detection opening is exposed. A tapered potion is formed in the upper portion of the casing in proximity to the channel. The tapered portion provides a space for a user to slide the write-protect member along the channel.

10 Claims, 8 Drawing Sheets

RECORDING/ERASING PREVENTION DEVICE

BACKGROUND OF THE INVENTION

This invention relates to a mistaken recording inhibiting mechanism for a tape cartridge having rotatable tape supply and tape takeup reels carrying a magnetic tape for recording information signals, such as data signals or speech signals, in which recording of the information signals on the magnetic tape may be disabled for inhibiting mistaken recording.

In a tape cartridge having rotatable tape supply and tape takeup reels carrying a magnetic tape for recording information signals, such as data signals or speech signals, there is provided a mistaken recording inhibiting mechanism for switching from an operating state enabling recording of information signals on the magnetic tape to another operating state disabling recording of information signals on the magnetic tape for preventing the recorded information signals from being erased inadvertently. In a tape cartridge for mainly personal use for recording music or speech signals, such mistaken recording inhibiting mechanism is constituted by a severable mistaken recording inhibiting piece provided at a portion of a main cartridge body made up of upper and lower cartridge halves.

Figure 10:
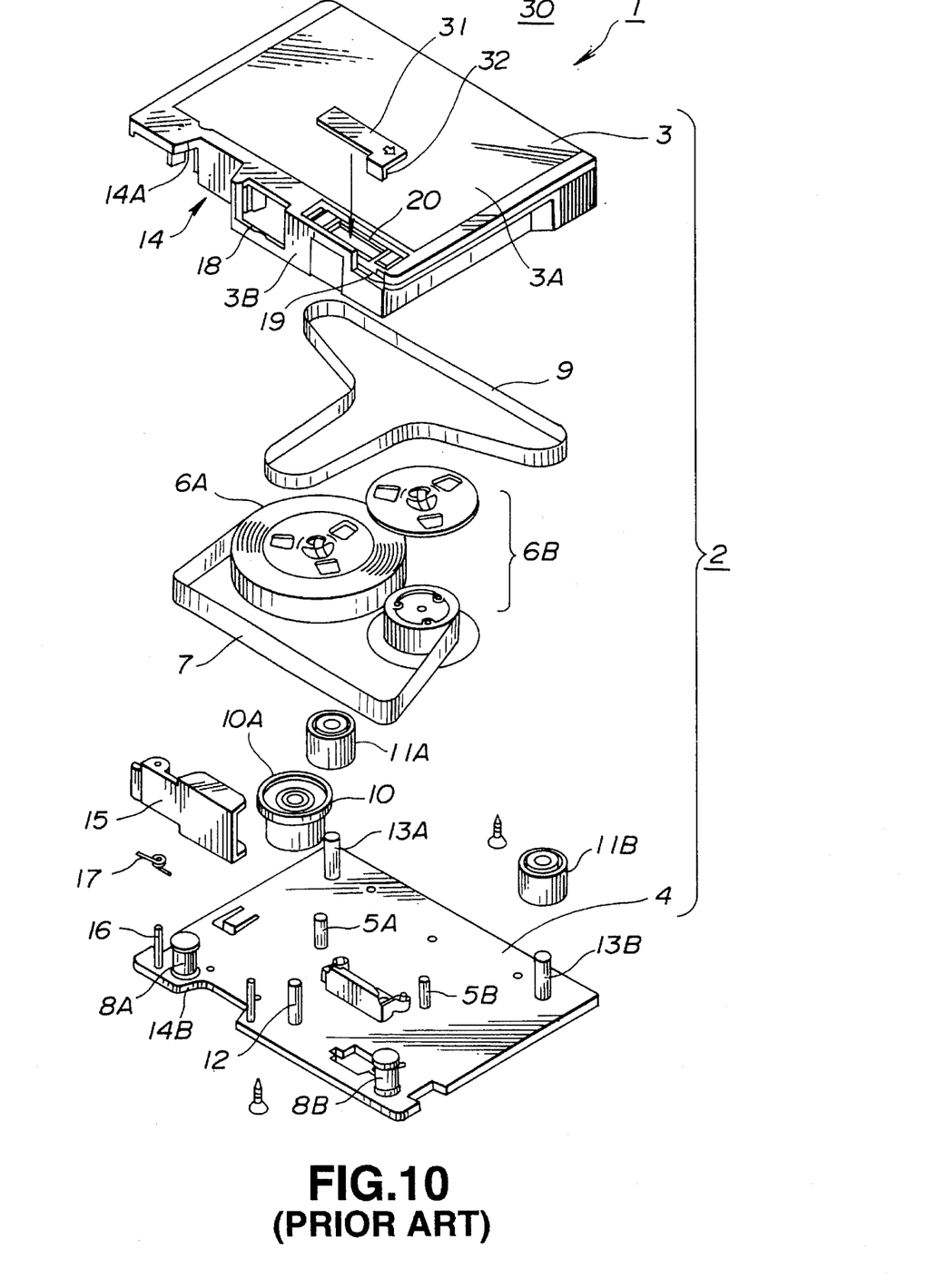
FIG. 10 is an exploded perspective view of a conventional tape cartridge.

In a tape cartridge 1 used for data backup for a personal computer or an office computer shown in FIG. 10, a mistaken recording inhibiting mechanism is constituted by a mistaken recording inhibiting member 30 which may be therefor along an operational guide recess 20 formed in a main cartridge body 2 between a first position of disabling recording of information signals on a magnetic tape 7 and a second position of closing a mistaken recording detection opening 19 in the cartridge main body 2 for enabling recording of information signals on the magnetic tape 7.

That is, the cartridge main body 2 of the tape cartridge 1 is made up of an upper half member 3 formed of a synthetic material in the shape of a shallow saucer and a base plate 4 of metal, such as aluminum, disposed in a lower opening of the upper half member 3. A tape supply reel 6A and a tape takeup reel 6B, carrying the magnetic tape 7, are rotatably supported by supporting pins 5A, 5B mounted at a distance from each other at a mid portion of the base plate 4. The magnetic tape 7, reeled out from the tape supply reel 6A, is guided along the front side of the cartridge main body 2 by tape guide rolls 8A, 8B provided at front side corners of the base plate 4 so as to be taken up on the tape takeup reel 6B.

The tape cartridge 1 has a tape driving mechanism for running the magnetic tape 7. The tape driving mechanism includes an endless belt 9 placed around a belt driving roll 10 and a pair of belt guide rolls 11A, 11B. The belt driving roll 10 is rotatably mounted on an upstanding supporting pin 12 at a front mid portion of the base plate 4. A driving flange 10A adapted for having a rolling contact with a driving roll 41 on the recording/reproducing apparatus as later explained is formed on an upper end of the belt driving roll 10. By such rolling contact, rotation of the driving roll 10 is transmitted to the driving roll 41. The belt guide rolls 11A, 11B are rotatably mounted on a pair of upstanding supporting pins 13A, 13B at rear corners of the base plate 4.

Figure 11:
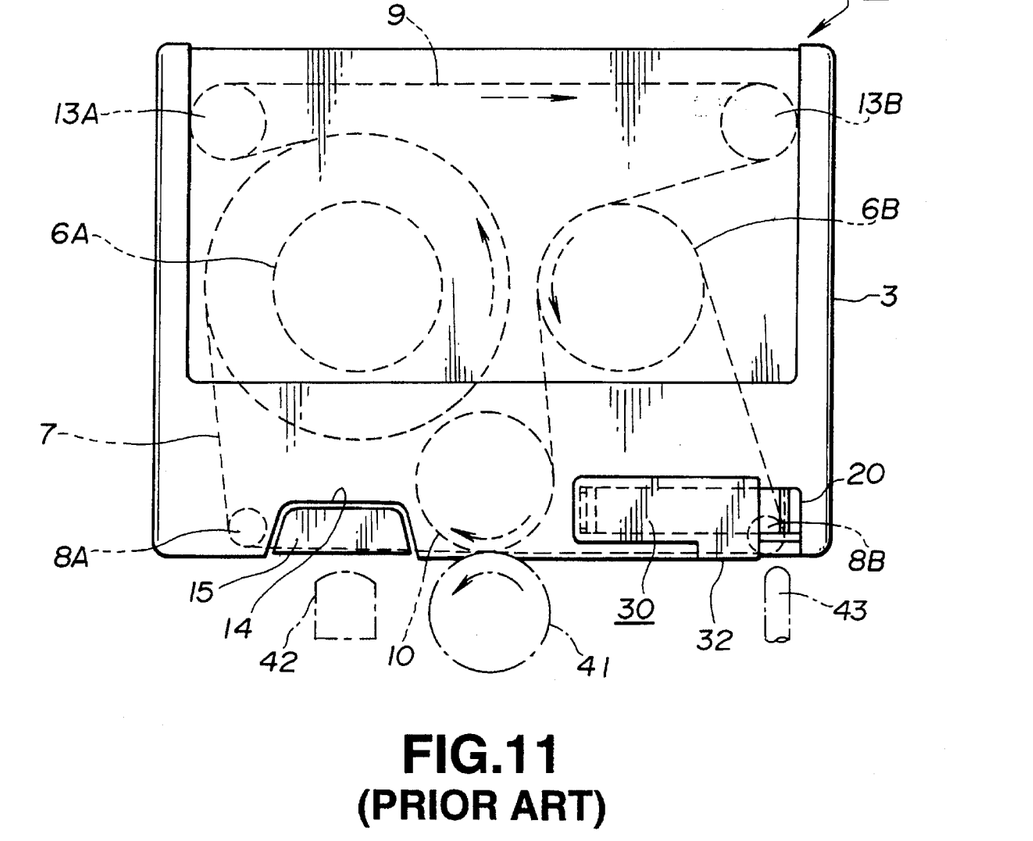
FIG. 11 is a plan view thereof.

Thus the endless belt 9 is run along a substantially convex-shaped travel path in the main cartridge body 2 by being placed around the belt guide rolls 11A, 11B and around the belt driving roll 10 by way of a mid portion between the tape supply reel 6A and the tape takeup reel 6B, with the endless belt 9 being kept in contact with the magnetic tape 7 placed around the tape supply reel 6A and the tape takeup reel 6B under a pre-set tension, as shown in FIG. 11.

On the front lateral side of the cartridge main body 2 is mounted a lid member 15 adapted for opening and closing a recording/playback opening 14 which is constituted by cut-outs 14A, 14B formed on the front lateral sides of the upper half member 3 and the base plate 4 and into which is introduced a recording/playback head 42 of the recording/reproducing apparatus. The lid member 15 is rotatably supported in a cantilevered fashion by an upstanding supporting pin 16 on a front side corner of the base plate 4 and is biased by a torsion spring 17 in a direction of closing the recording/playback opening 14.

Figure 12:
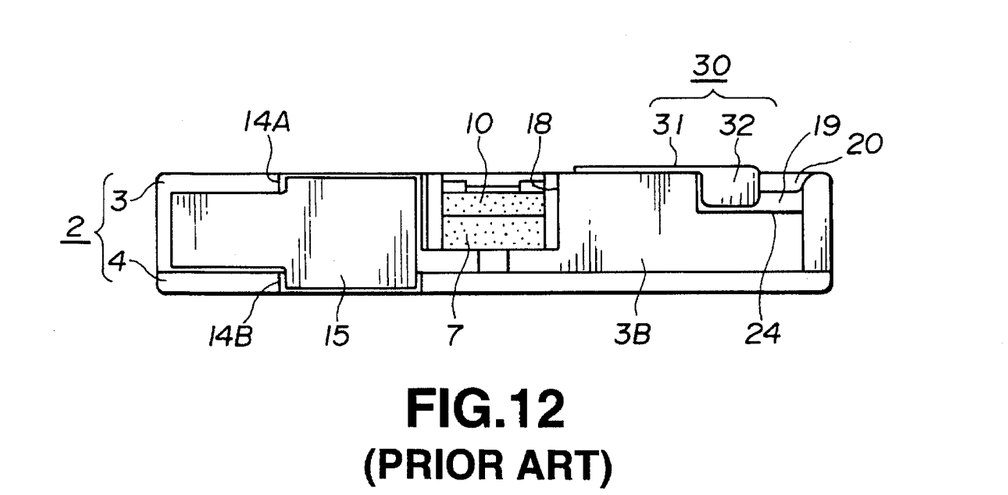
FIG. 12 is a front view thereof.

In a front lateral surface 3B of the upper half member 3 of the cartridge main body 2 is formed a rectangular driving opening 18 by which the peripheral surface of the belt driving roll 10 is partially exposed to outside. In the opposite side of the front lateral surface 3B with respect to the lid member 15 is formed a slide groove 24 in which slides a mistaken recording inhibiting portion 32 of a mistaken recording inhibiting member 30 as later explained. Within the slide groove 24 is formed a mistaken recording detection opening 19.

The mistaken recording detection opening 19 is opened on an upper surface 3A of the upper half member 3, and an operating guide recess 20 in which to load the mistaken recording inhibiting member 30 is formed on the upper surface 3A in communication with an upper portion of the opened mistaken recording inhibiting opening 19.

The operating guide recess 20 is formed in the upper surface 3A of the upper half member 3 as a rectangular elongated opening extending along the front lateral surface 3B and is of a length sufficient to permit the mistaken recording inhibiting portion 32 of the mistaken recording inhibiting member 30 to be moved between the first position of opening the mistaken recording detection opening 19 and the second position of closing the mistaken recording detection opening 19. The slide groove 24 is also formed in the front lateral surface 3B as a rectangular groove of a length sufficient to permit the mistaken recording inhibiting portion 32 of the mistaken recording inhibiting member 30 to be moved between the first position of opening the mistaken recording detection opening 19 and the second position of closing the mistaken recording detection opening 19.

The mistaken recording inhibiting member 30 is molded from a synthetic material and is formed by a plate-shaped main portion 31 and the mistaken recording inhibiting portion 32. The main portion of the mistaken recording inhibiting member 30 has a thickness such that, when the mistaken recording inhibiting member 30 is loaded in the operating guide recess 20, the main portion 31 is flush with the upper surface 3A of the upper half member 3. On the other hand, the mistaken recording inhibiting portion 32 is of a size and profile such that, when the mistaken recording inhibiting member 30 is moved to the second position, the mistaken recording inhibiting portion 32 closes the recording detection opening 19.

When the above-described tape cartridge 1 is loaded in position in the recording/reproducing apparatus, lid member opening means provided on the recording/reproducing apparatus is engaged with the proximal end of the lid member 15 for rotating the lid member 15 against the bias of the torsion spring 17 for opening the recording/reproducing opening 14. The recording/reproducing head 42 is intruded via the opened recording/reproducing opening 14 into the main cartridge body 2 into contact with the magnetic tape 7. On the other hand, the driving roll 41 is intruded via the driving opening 18 into contact with the driving flange 10A of the belt driving roll 10, with the interposition of the magnetic tape 7 and the endless belt 9.

If the recording/playback operation is subsequently performed on the side of the recording/reproducing apparatus, the belt driving roll 10 is rotated clockwise, with the interposition of the driving roll 41, rotated counterclockwise, as indicated by arrows in FIG. 11. By such rotation of the belt driving roll 10, the endless belt 9 in its entirety is rotated clockwise. Thus the tape supply reel 6A, contacted with the endless belt 9 with a pre-set tension, is rotated counterclockwise for reeling out the magnetic tape 7, with the tape takeup reel 6B taking up the reeled out magnetic tape 7. Recording or reproduction of information signals recorded on the magnetic tape 7 running along the front lateral surface 3B of the cartridge main body 2 is then achieved by the recording/reproducing head 42 facing the inside of the cartridge main body 2 via the recording/ reproducing opening 14 so as to be contacted with the magnetic tape 7.

Figure 14:
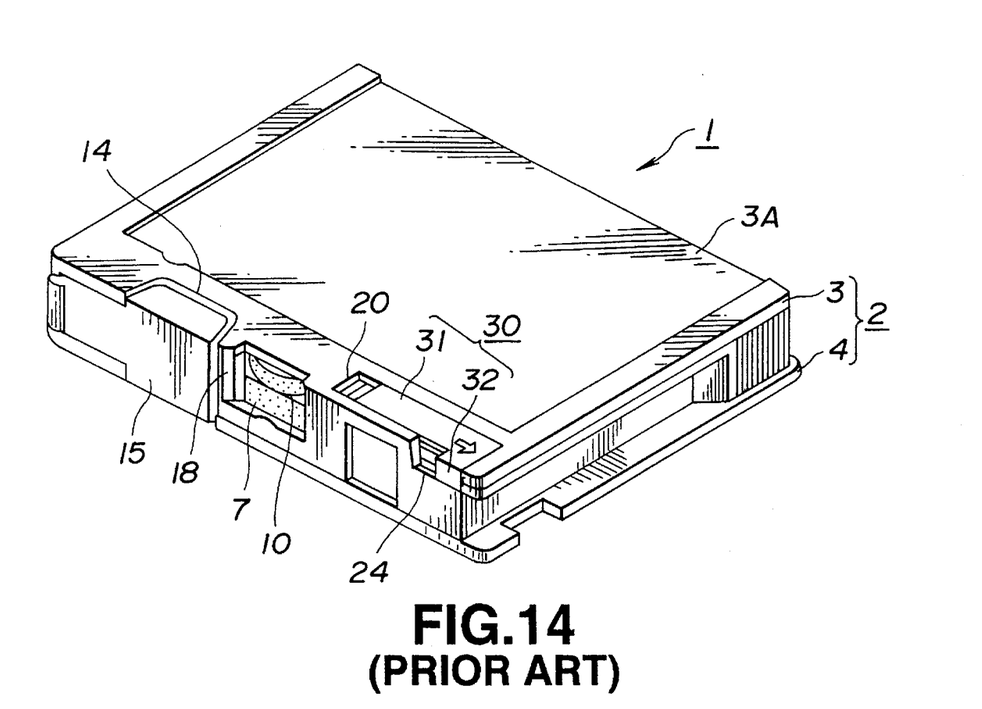
FIG. 14 is a perspective view of the tape cartridge of FIG. 10 in which the mistaken recording inhibiting member thereof is set to its second position.

Meanwhile, recording of the information signals on the magnetic tape 7 by the recording/reproducing head 42 is possible when the mistaken recording inhibiting member 30 is set in the second position. That is, when the mistaken recording inhibiting member 30 is set to the second position in which the mistaken recording inhibiting member 30 is located on the right-hand side of the cartridge main body 2 along the operating guide recess 20, and the mistaken recording inhibiting portion 32 is moved within the slide groove 24 to close the mistaken recording detection opening 19, a mistaken recording detection element 43 of the recording/reproducing apparatus is prevented from being therefor into the mistaken recording detection opening 19 in order to make possible the recording of the information signals on the magnetic tape 7 by the recording/reproducing head 42.

Figure 13:
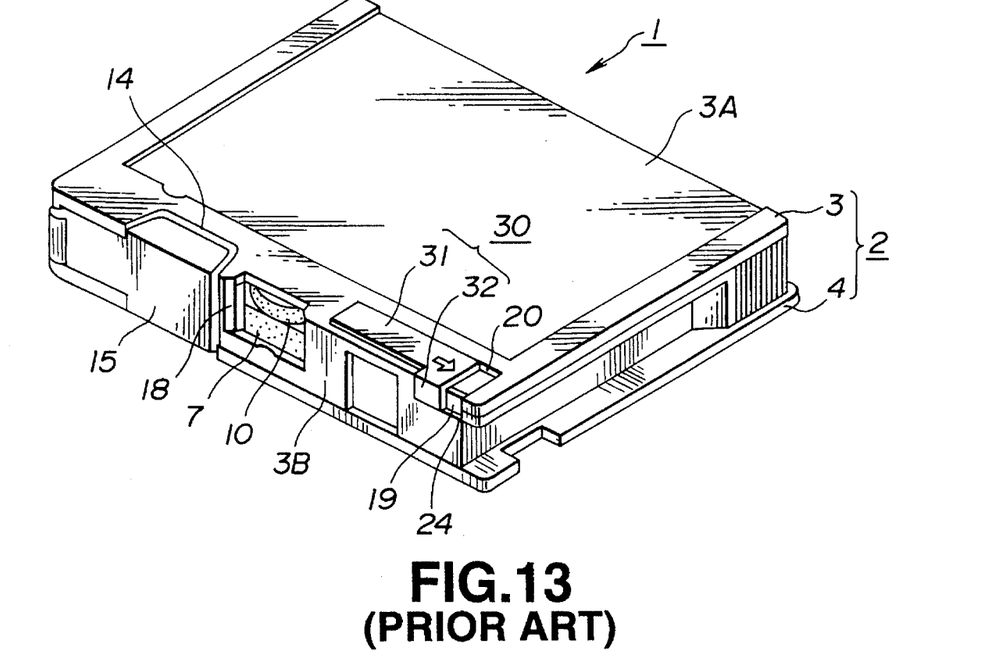
FIG. 13 is a perspective view of the tape cartridge of FIG. 10 in which the mistaken recording inhibiting member thereof is set to its first position.

On the other hand, if the mistaken recording inhibiting member 30 is moved from the above-mentioned second position to the first position along the operating guide recess 20, as shown in FIG. 13, the closed state of the mistaken recording detection opening 19 by the mistaken recording inhibiting portion 32 ceases, so that the mistaken recording detection opening 19 is opened. Thus the mistaken recording detection element 43 is therefor into the mistaken recording detection opening 19 to inhibit recording of information signals on the magnetic tape 7 by the recording/reproducing head 42.

With the above-described conventional tape cartridge 1, the mistaken recording inhibiting member 30 is loaded in the operating guide recess 20, by thrusting the plate-shaped main portion 31 with finger's end, with the plate-shaped main portion 31 being substantially flush with the upper surface 3A of the upper half member 3. Thus an extremely large force is required for moving the mistaken recording inhibiting member 30, thus rendering it extremely difficult to therefor the position of the mistaken recording inhibiting member 30 between the first position and the second position.

Consequently, if the user has made a recording operation with the mistaken recording inhibiting member 30 set to the recording enabling second position, based on a mistaken notion that the mistaken recording inhibiting member 30 has been set to the recording disabling first position, the information signals recorded on the magnetic tape are irrevocably erased. On the other hand, if the user has made a recording operation with the mistaken recording inhibiting member 30 set to the recording disabling first position, based on a mistaken notion that the mistaken recording inhibiting member 30 has been set to the recording enabling second position, the result is failure in recording information signals or in preparation of a backup file.

It is a frequent practice that a tool having a pointed end, such as pincers, is pried into a space between the main portion 31 and the operating guide recess 20 for forcing the mistaken recording inhibiting member 30 into movement. However, if such tool is used, it may occur that the mistaken recording inhibiting member 30 or the operating guide recess 20 be damaged or fractured. On the other hand, if the above tool is forced into the space between the main portion 31 and the operating guide recess 20, it may occur that the mistaken recording inhibiting member 30 be detached from the operating guide recess 20.

OBJECT AND SUMMARY OF THE INVENTION

It is therefore an object of the present invention to provide a mistaken recording inhibiting mechanism for a tape cartridge whereby the mistaken recording inhibiting member 30 may be positively moved commutatively between the first position of disabling recording of information signals on the magnetic tape and the second position of enabling recording of information signals on the magnetic tape.

According to the present invention, there is provided a tape cartridge including a mistaken recording inhibiting member having a main portion and a mistaken recording inhibiting portion extending perpendicularly to said main portion, a cartridge half having detection means into which a mistaken insertion inhibiting element provided in a tape cartridge driving unit is inserted. The cartridge half has a recess formed on its upper surface for accommodating the mistaken recording inhibiting member for sliding movement between a first position closing the detection means by the mistaken insertion inhibiting portion and a second position opening the detection means. There is provided a tapered portion in a lateral surface of the cartridge half in the vicinity of the end towards the first position of the mistaken recording inhibiting portion when the mistaken recording inhibiting member is at the first position. With the tape cartridge having the mistaken recording inhibiting mechanism according to the present invention, since the mistaken recording inhibiting member may be therefor in its operating position by a relatively light pressure without changing the basic design format of the customary tape cartridge, the information signals may be positively encoded on the magnetic tape, while recorded information signals may be prevented from being erased inadvertently.

With therefor the tape cartridge having the mistaken recording inhibiting mechanism according to the present invention, since the mistaken recording inhibiting member may be changed over in its operating position without applying an undue pressure, it becomes possible to prevent the mistaken recording inhibiting member from being fractured or deformed. This accomplished with no risk of the metal mold for the upper half member becoming complex in shape. Moreover, the design appearance of the tape cartridge may also be maintained.

Referring to the drawings, preferred embodiments of the present invention will be explained in detail. Similarly to the above-described conventional tape cartridge 1, a tape cartridge 50 shown in FIGS. 1 to 5 is employed for data backup for a personal computer or an office computer, and has its basic arrangement in common with the conventional tape cartridge 1. Thus the common parts or components are denoted by the same Reference numerals and the corresponding description is omitted for simplicity.

Figure 4:
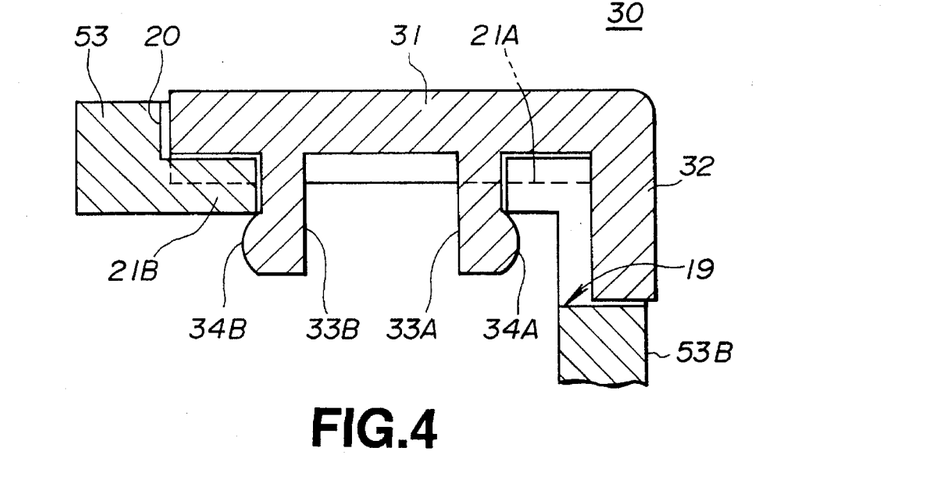
FIG. 4 is a schematic longitudinal cross-sectional view of the mistaken recording inhibiting mechanism for the tape cartridge shown in FIG. 1.
Figure 5:
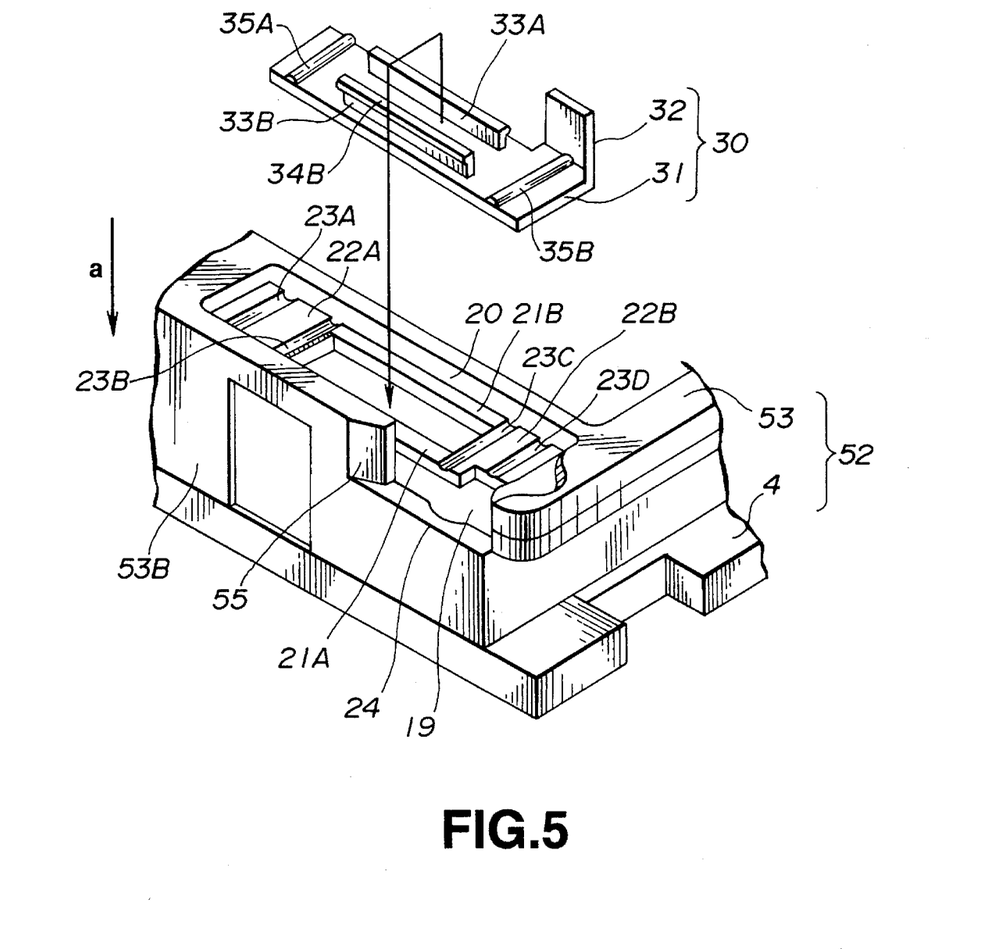
FIG. 5 is a fragmentary exploded perspective view showing the mistaken recording inhibiting mechanism for the tape cartridge shown in FIG. 1.

In addition to the description of the conventional tape cartridge 1, description of the construction of a mistaken recording inhibiting member 30 constituting a mistaken recording inhibiting mechanism and an operating guide recess 20 into which the mistaken recording inhibiting member 30 is movably mounted is now made by referring to FIGS. 4 and 5. The operating guide recess 20, formed at a corner on an upper surface 53A of an upper half member 53, basically similar in shape to the upper half member 3, is of such a length as to permit the mistaken recording inhibiting member 30 to be moved between a first position in which a mistaken recording inhibiting portion 32 of the mistaken recording inhibiting member 30 opens a mistaken recording detection opening 19 and a second position in which the mistaken recording inhibiting portion 32 closes the opening 19.

From forward and rear sidewall sections of the operating guide recess 20 are extended opposing upstanding guide wall sections 21A, 21B in the form of thin sheets, as shown in FIG. 4. From both longitudinal sidewall sections of the operating guide recess 20 are formed supporting wall sections 22A, 22B for defining a bottom wall section of the operating guide recess 20 for supporting the lower surface of the mistaken recording inhibiting member 30. First and second click grooves 23A, 23B and third and fourth click grooves 23C, 23D are formed on the upper surfaces of the supporting wall sections 22A, 22B for traversing the upper surface in the fore-and-aft direction, as shown in FIG. 5. These first and second click grooves 23A, 23B and third and fourth click grooves 23C, 23D are selectively engaged by first and second click projections 35A, 35B formed on the bottom surface of the main portion 31 of the mistaken recording inhibiting member 30 for stably holding the mistaken recording inhibiting member 30 at the first or second position.

The mistaken recording inhibiting member 30 is molded of a synthetic material and includes a pair of guide ribs 33A, 33B on the bottom surface of the main portion 31 at a distance from each other along its width. The outer surfaces of the distal ends of these guide ribs 33A, 33B are formed with engaging projections 34A, 34B, respectively. The distance between these engaging projections 34A, 34B and the bottom surface of the main portion 31 is substantially equal to the thickness of the guide wall section 21A or 21B, while the distance between the projections 34A and 34B is substantially equal to the distance between the guide wall sections 21A and 21B. Consequently, the mistaken recording inhibiting member 30 is loaded in position in the operating guide recess 20 by being strongly thrust into the recess 20, with the engaging projections 34A, 34B of the guide ribs 33A, 33B engaging with the lower surfaces of the guide wall sections 21A, 21B, respectively, as shown in FIG. 4.

Figure 2:
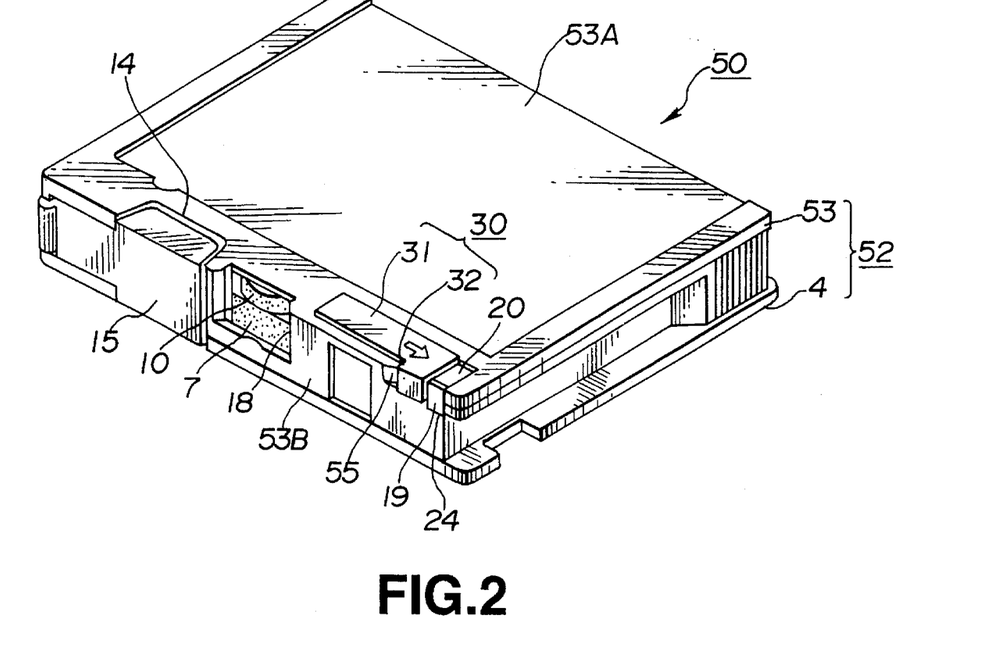
FIG. 2 is a perspective view of the tape cartridge of FIG. 1 in which the mistaken recording inhibiting member of the tape cartridge is set to its first position.

When the mistaken recording inhibiting member 30 is set at the first position, the mistaken recording inhibiting portion 32 is receded from and hence opens the mistaken recording detection opening 19, as shown in FIG. 2. Consequently, on loading the tape cartridge 50 in the recording/reproducing apparatus, the mistaken recording detection element 43 may be intruded into the inside of the cartridge main body 52, thereby disabling the recording of information signals by the recording/playback head 42 on the magnetic tape 7. In such first position, the first click projection 35A and the second click projection 34B formed on the bottom surface of the main portion 31 are engaged with the first click groove 23A and the third click groove 23C of the supporting wall sections 22A and 22B, respectively.

Figure 3:
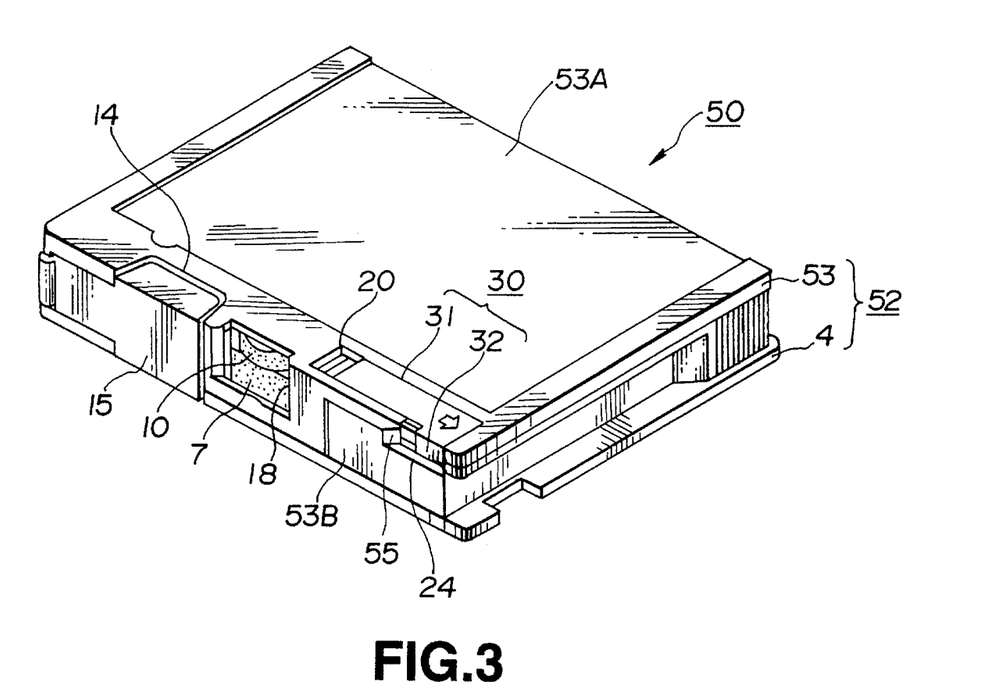
FIG. 3 is a perspective view of the tape cartridge of FIG. 1 in which the mistaken recording inhibiting member of the tape cartridge is set to its second position.

When the mistaken recording inhibiting member 30 is set at the second position, the mistaken recording inhibiting portion 32 closes the mistaken recording detection opening 19, as shown in FIG. 3. Consequently, on loading the tape cartridge 50 in the recording/reproducing apparatus, the intrusion of the mistaken recording detection member 43 into the inside of the cartridge main body 52 is inhibited, thereby enabling the recording of information signals by the recording/playback head 42 on the magnetic tape 7. In such second position, the first click projection 35A and the second click projection 35B formed on the bottom surface of the main portion 31 are engaged with the second click groove 23B and the fourth click groove 23D of the supporting wall sections 22A and 22B, respectively.

Figure 1:
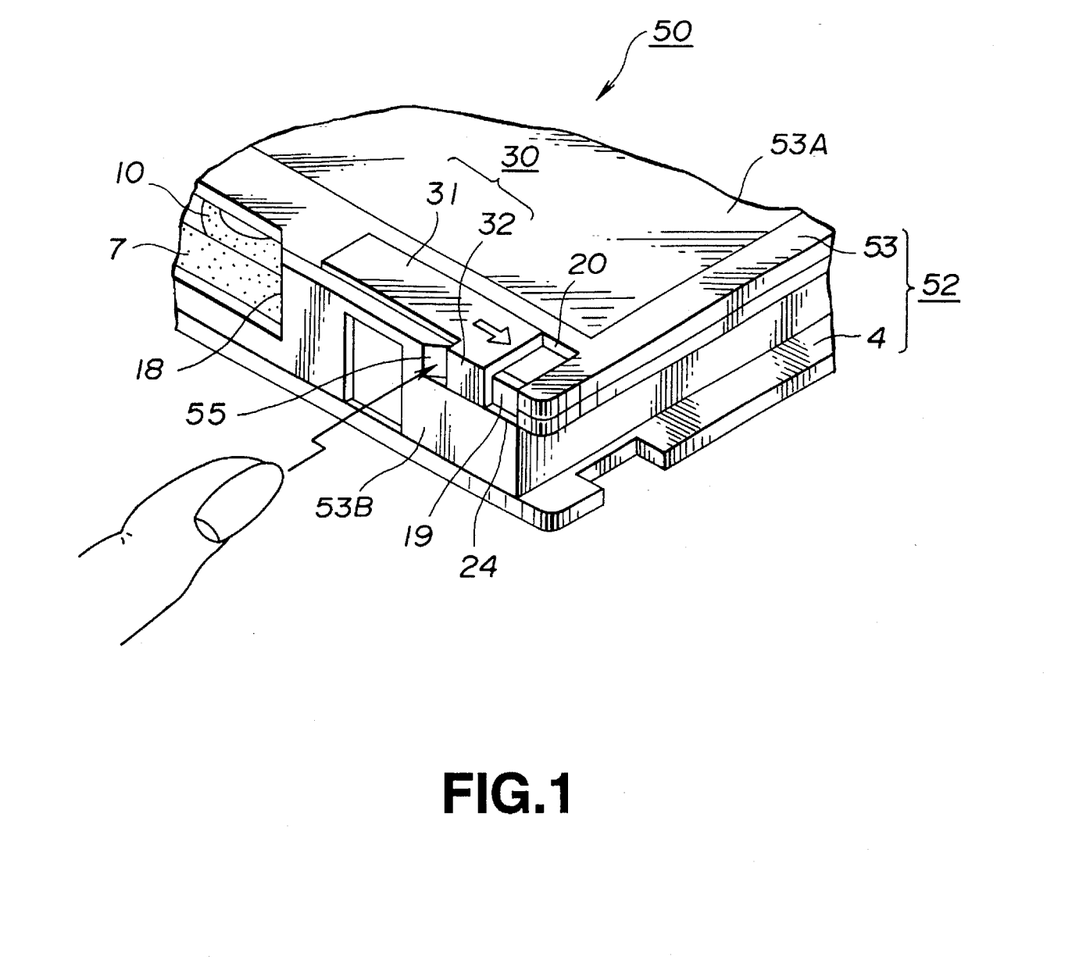
FIG. 1 is a fragmentary perspective view for illustrating the operation of a mistaken recording inhibiting member of a mistaken recording inhibiting mechanism for a tape cartridge according to the present invention.

For moving the mistaken recording inhibiting member 30 from its first position to its second position, the operator inserts his or her finger in a space delimited by a tapered portion 55, formed laterally of the mistaken recording inhibiting portion 32, for actuating the mistaken recording inhibiting member 30. The lateral wall section of a slide groove 24 connecting to a driving opening 18 of a front lateral surface 53B of the upper half member 53 along which slides the mistaken recording inhibiting portion 32 is formed as the tapered portion 55 for increasing the width of the opened surface area.

Thus the tapered portion 55 is formed between a lateral wall surface of the slide groove 24 and the lateral side of the mistaken recording inhibiting portion 32, as shown in FIG. 1. The mistaken recording inhibiting member 30 has its lateral side acted upon by the finger's end inserted into the space defined by the tapered portion 55 so that it may be changed over from the first position to the second position by a smaller force.

With the above-described tape cartridge 50, one of the lateral surfaces delimiting the slide groove 24 of the mistaken recording inhibiting portion 32 of the mistaken recording inhibiting member 30 is the tapered wall section 55, so that the mistaken recording inhibiting member 30 may be improved in operability without changing the basic design format of the mistaken recording inhibiting member 30 and may be positively changed over between the first position and the second position.

In addition, since the tapered portion 55 is provided extending in a direction perpendicular to the click grooves 23A, 23B, 23C and 23D, there is no force applied during movement of the mistaken recording inhibiting member 30 in a direction of engagement between the click projections 35A, 35B and the click grooves 23A, 23B, 23C and 23D, that is in a direction shown by arrow a in FIG. 5. The result is smooth movement of the mistaken recording inhibiting member 30.

It is to be noted that the disposition between the click grooves and the click projections may be reversed, that is, the click grooves and the click projections may be provided in the mistaken recording inhibiting member 30 and in the operating guide recess 20, respectively.

In addition, with the present embodiment, if the cartridge main body is held in one hand and the mistaken recording inhibiting member 30 moved with the other hand, the mistaken recording inhibiting member 30 may be acted upon easily from the lateral surface of the cartridge main member to permit facilitated operation of the mistaken recording inhibiting member 30.

Figure 6:
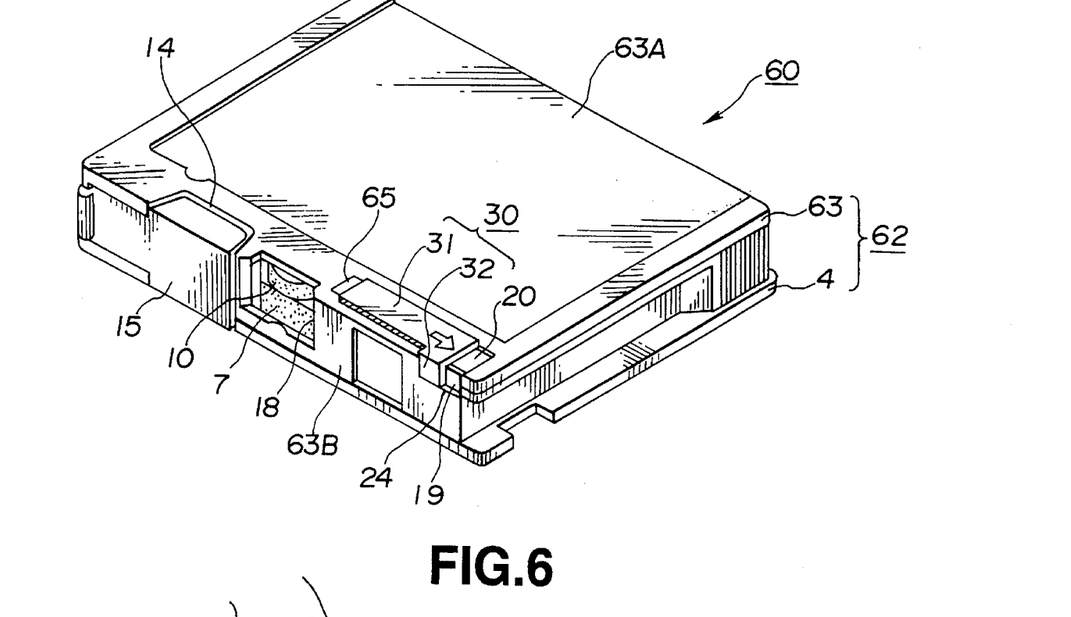
FIG. 6 is a perspective view showing a tape cartridge according to a second embodiment of the present invention, in which the mistaken recording inhibiting member is set to its first position.
Figure 7:
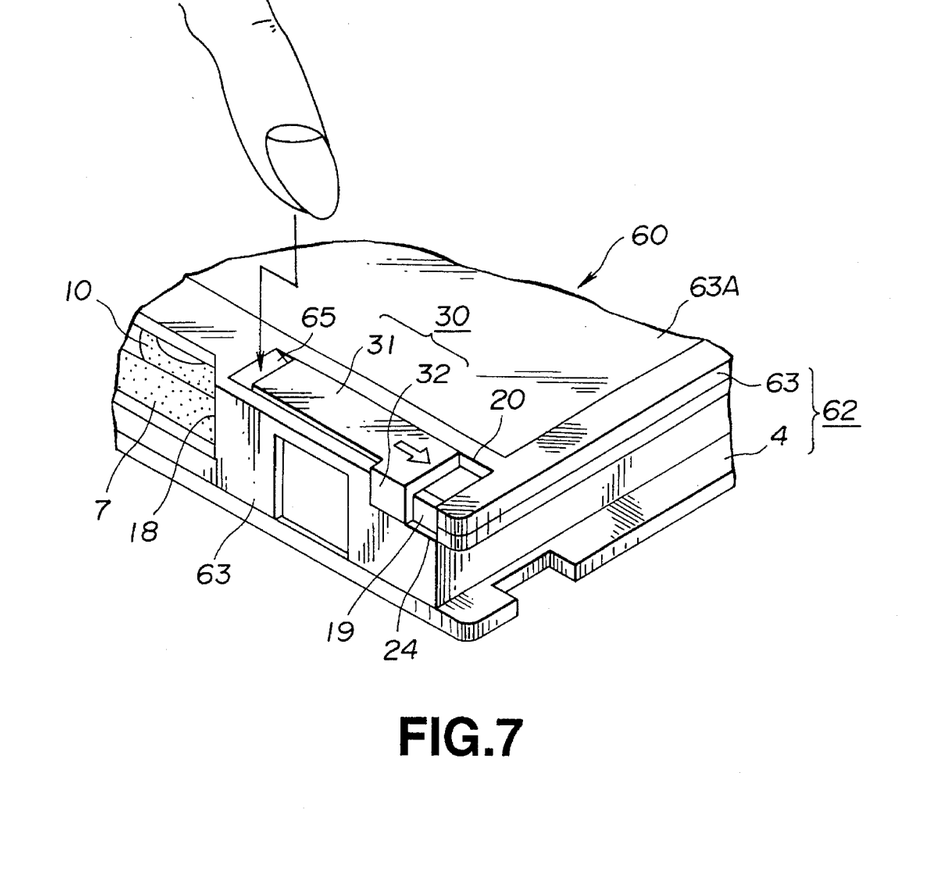
FIG. 7 is a fragmentary perspective view for illustrating the operation of the mistaken recording inhibiting member for the tape cartridge shown in FIG. 6.

FIGS. 6 and 7 show a second embodiment of a tape cartridge 60 according to the present invention in which a tapered portion 65 for moving the mistaken recording inhibiting member 30 is formed between the main portion 31 of the mistaken recording inhibiting member 30 and the operating guide recess 20. That is, the lateral wall towards the driving opening 18 of the operating guide recess 20 formed in the upper surface 63A of the upper half member 63 is tapered for increasing the opening width on the upper surface 63A of the upper half member 63.

Consequently, there is defined a space by the tapered portion 65 between the lateral side of the mistaken recording inhibiting member 30 and the lateral wall of the operating guide recess 20, and hence the lateral side of the mistaken recording inhibiting member 30 may be acted upon by the finger's end inserted in this space. Thus the mistaken recording inhibiting member 30 may be positively moved with a relatively small force between its first and second positions.

Figure 8:
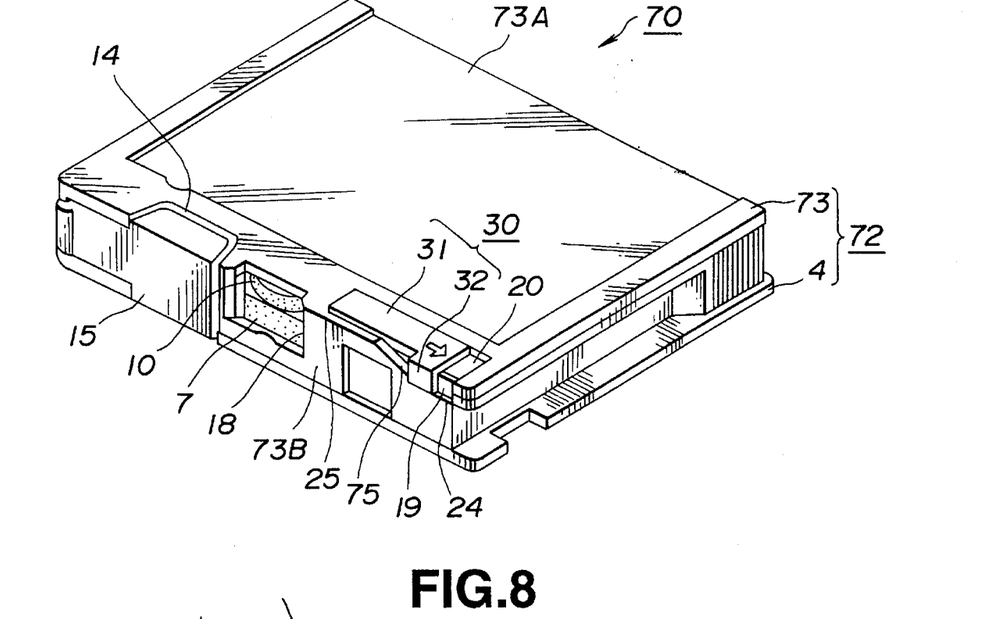
FIG. 8 is a perspective view showing a tape cartridge according to a second embodiment of the present invention, in which the mistaken recording inhibiting member is set to its first position.
Figure 9:
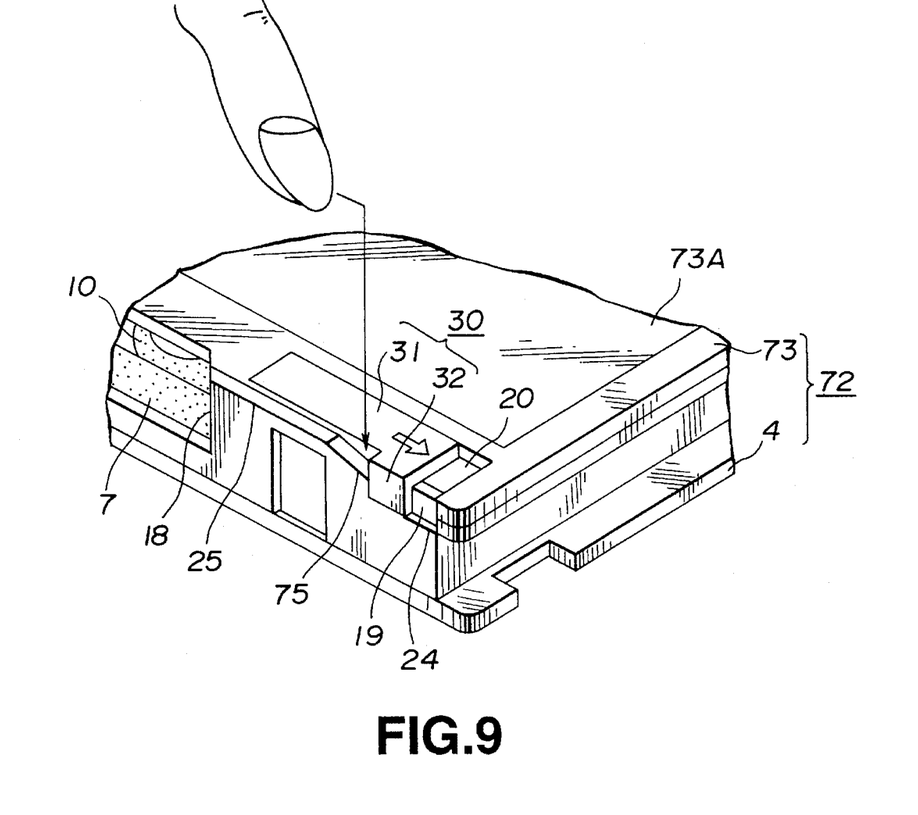
FIG. 9 is a fragmentary perspective view for illustrating the operation of the mistaken recording inhibiting member for the tape cartridge shown in FIG. 8.

FIGS. 8 and 9 show a third embodiment of a tape cartridge 70 according to the present invention in which the space for moving the position of the mistaken recording inhibiting member 30 is formed on a ridge defined by a major surface 73A and a front lateral surface 73B of an upper half member 73. That is, the upper portion of the lateral surface towards the driving opening 18 of the slide groove 24 formed in the front lateral surface 73B of the upper half member 73 in which is slid the mistaken recording inhibiting portion 32 is formed as a tapered wall opened on the upper surface 73A for increasing the opening width. In other words, a tapered portion 75 is formed on a front ridge 25 of the upper half member 73 for extending across the lateral wall of the operating guide recess 20 and the lateral surface of the slide groove 24.

Thus the tapered portion 75 is formed for extending across the lateral surface of the main portion 31 of the mistaken recording inhibiting member 30 or the lateral side of the mistaken recording inhibiting portion 32, the lateral wall of the operating guide recess 20 and the lateral surface of the slide groove 24 and hence the lateral side of the mistaken recording inhibiting member 30 may be acted upon by the finger's end inserted in the space defined by the tapered portion 75, so that the mistaken recording inhibiting member 30 may be positively moved with a relatively small force between the first and second positions.

In the above described tape cartridges 50, 60 and 70 according to the first to third embodiments of the present invention, the tapered portions 55, 65, 75 into which the operator may insert his or her finger during moving of the mistaken recording inhibiting member 30 between its first and second positions are formed towards one of the lateral surfaces of the main portion 31 or the mistaken recording inhibiting member 30. Alternatively, such tapered portion delimiting a space within which the user may insert his or her finger during moving of the mistaken recording inhibiting member 30 between the first and second positions may be formed on the opposite lateral surface or on both lateral surfaces of the main portion 31 or the mistaken recording inhibiting member 30.

What is claimed is:

1. A tape cartridge comprising:

a cartridge casing having a detection portion for accommodating a mistaken insertion inhibiting element of a tape cartridge driving unit, said cartridge casing having a recess formed on an upper surface thereof;

a mistaken recording inhibiting member having a main portion and a mistaken recording inhibiting portion extending perpendicularly to said main portion, said mistaken recording inhibiting member being disposed within said recess of said cartridge casing so as to slide between a first position closing said detection portion with said mistaken insertion inhibiting portion and a second position opening said detection portion;

wherein a tapered portion is provided in an external surface of said cartridge casing in proximity to said mistaken recording inhibiting portion when said mistaken recording inhibiting member is at said second position, said tapered portion providing a space for a user to slide said write-protect member along said channel;

click means comprised of projections or recesses formed on the reverse surface of the main portion of the mistaken recording inhibiting member and mating recesses or projections formed on a concave portion of said cartridge casing.

2. The tape cartridge as claimed in claim 1 wherein said tapered portion is provided in a lateral surface of said cartridge casing.

3. The tape cartridge as claimed in claim 1 wherein said tapered portion is provided in an upper surface of said cartridge casing.

4. The tape cartridge as claimed in claim 1 wherein said tapered portion is provided at a corner portion of said cartridge casing defined by an upper surface and a lateral surface of said cartridge casing.

5. A tape cartridge adapted for selective read-write or read only usage, comprising:

a casing having an upper portion and a lower portion;

a channel formed in said upper of portion of said casing, said channel being disposed at a corner portion defined by an external upper surface and an external lateral surface of said casing, wherein said channel comprises a first rectangular-shaped portion formed in said upper surface and a second, adjacent rectangular-shaped channel formed in said lateral surface;

a read-only detection opening formed within said channel; and a slidable write-protect member having a main portion and a side portion formed perpendicular to said main portion, said write-protect member being disposed within said recess and adapted for movement between a first position in which said side portion covers said read-only detection opening and a second position in which said read-only detection opening is exposed;

wherein a tapered portion is formed in said upper portion of said casing in proximity to said channel and to said write-protect member when said write-protect member is in said second position, said tapered portion providing a space for a user to slide said write-protect member along said channel.

6. The tape cartridge of claim 5 wherein said tapered portion is provided in said lateral surface of said upper portion of said casing.

7. The tape cartridge of claim 5 wherein said tapered portion is provided in said upper surface of said upper portion of said cartridge casing.

8. The tape cartridge of claim 5 further comprising a pair of rib guides disposed on an internal surface of said write-protect member, said rib guides having projections formed thereon which engage an edge portion of said channel so as to retain said write-protect member in said channel.

9. The tape cartridge of claim 5 further comprising at least one projection disposed on an inner surface of said write-protect member and at least one groove disposed within said channel adapted to receive said at least one projection, said groove being formed so as to retain said write-protect member in either said first position or said second position.

10. The tape cartridge of claim 9 wherein a pair of projections are disposed on said write-protect member and a first pair and a second pair of grooves are disposed within said channel, said first pair of grooves being formed so as to retain said write-protect member in said first position and said second pair of grooves being formed so as to retain said write-protect member in said second position.

* * * * *